US 12,542,066 B2

United States Patent
Shenoy et al.

(10) Patent No.: US 12,542,066 B2
(45) Date of Patent: Feb. 3, 2026

(54) SYSTEMS AND METHODS FOR GENERATING PERSONALIZED INTERFACE CONTENT PLANS

(71) Applicant: Wolters Kluwer Health, Inc., Walthman, ME (US)

(72) Inventors: Siddharth Subhash Shenoy, Jersey City, NJ (US); Omar Bari, Brownstown, MI (US); Farzaneh Mohajerani, Newton, MA (US); Elizabeth Pinchak Gentzler, Charlottessville, VA (US); Shiquan He, Waltham, MA (US); Nitish Singhal, Woonsocket, RI (US)

(73) Assignee: Wolters Kluwer Health, Inc., Waltham, MA (US)

( * ) Notice: Subject to any disclaimer, the term of this patent is extended or adjusted under 35 U.S.C. 154(b) by 0 days.

(21) Appl. No.: 18/435,011

(22) Filed: Feb. 7, 2024

(65) Prior Publication Data

US 2025/0252861 A1    Aug. 7, 2025

(51) Int. Cl.
| | | |
|---|---|---|
| *G09B 5/02* | (2006.01) | |
| *G06F 9/451* | (2018.01) | |
| *G06F 16/2457* | (2019.01) | |
| *G09B 5/06* | (2006.01) | |
| *G09B 7/06* | (2006.01) | |

(52) U.S. Cl.
CPC ............... *G09B 5/02* (2013.01); *G06F 9/451* (2018.02); *G06F 16/24578* (2019.01); *G09B 5/065* (2013.01); *G09B 7/06* (2013.01)

(58) Field of Classification Search
CPC .......................... G06F 9/451; G06F 16/24578
See application file for complete search history.

(56) References Cited

U.S. PATENT DOCUMENTS

2008/0235005 A1\* 9/2008 Golan ................... H04L 67/306
709/241

\* cited by examiner

*Primary Examiner* — Kesha Frisby
(74) *Attorney, Agent, or Firm* — Morgan, Lewis & Bockius LLP

(57) ABSTRACT

Systems and methods of generating a personalized study plan with remedial content are disclosed. A first interface is generated including one or more sets of interface elements. The first interface allows selection of one interface element in each of the one or more sets of interface elements. The selected one interface element for each of the one or more sets of interface elements and a set of user preferences is obtained. Each of the selected one interface element is associated with the one or more factors including a tag and a semantic text. One or more opportunity areas based on the set of answers of the user data is determined and a plurality of content based on the one or more factors is identified. A second interface is generated. The second interface is comprised of one or more study features based on the one or more opportunity areas, the plurality of content, and the set of user preferences of the user.

20 Claims, 8 Drawing Sheets

SYSTEMS AND METHODS FOR GENERATING PERSONALIZED INTERFACE CONTENT PLANS

TECHNICAL FIELD

This application relates generally to generation of interface content plans, and more particularly, to generation of personalized interface content plans including remedial content.

BACKGROUND

Knowledge-based interfaces provide elements and content related to one or more knowledge domains, such as, for example, to assist users in preparing for a test or other evaluation. Current knowledge-based interfaces utilize predetermined agendas that are the same for all users. Such knowledge-based interfaces typically cover the main topics of a knowledge domain and may provide interface elements configured for practice on those topics. While generalized content agendas may be effective for some users, current knowledge-based interfaces are unable to focus on individual user's customized knowledge requirements. For example, one user may struggle with a certain topic or sub-category of knowledge different from that of another user. Current interfaces fail to provide personalized interface elements directed to the specific areas of need for each user that relate to and aid in understanding the specific topic or sub-category.

Using current systems, when a user has a specific deficiency in a topic or sub-category of content that should be reviewed, the user must first identify the deficiency. After identifying the specific topic or sub-category, the user must then utilize or develop the necessary time, resources, or knowledge to find content related to the specific deficiency. In some instances, users are required to proceed through a knowledge-based interface at a set pace or schedule and/or following the predetermined agenda. Thus, current systems require users to choose between falling behind in a schedule to independently find content or move forward with the content agenda without receiving additional help, potentially causing knowledge gaps.

SUMMARY

In various embodiments, a system is disclosed. The system includes a non-transitory memory and a processor communicatively coupled to the non-transitory memory. The processor is configured to read a set of instructions to generate a first interface including one or more sets of interface elements. The first interface allows selection of one interface element in each of the one or more sets of interface elements. The processor is further configured to obtain the selected one interface element for each of the one or more sets of interface elements and a set of user preferences. Each of the selected one interface element is associated with the one or more factors including a tag and a semantic text. The processor is further configured to determine one or more opportunity areas based on the set of answers of the user data and identifying a plurality of content based on the one or more factors. The processor is further configured to generate a second interface. The second interface is comprised of one or more study features based on the one or more opportunity areas, the plurality of content, and the set of user preferences of the user data.

In various embodiments, a computer implemented method is disclosed. The computer implemented method includes a step of generating a first interface including one or more sets of interface elements. The first interface allows selection of one interface element in each of the one or more sets of interface elements. The computer-implemented method further includes a step of obtaining the selected one interface element for each of the one or more sets of interface elements and a set of user preferences. Each of the selected one interface element is associated with the one or more factors including a tag and a semantic text. The computer-implemented method further includes a step of determining one or more opportunity areas based on the set of answers of the user data and identifying a plurality of content based on the one or more factors. The computer-implemented method further includes a step of generating a second interface. The second interface is comprised of one or more study features based on the one or more opportunity areas, the plurality of content, and the set of user preferences of the user.

In various embodiments, a non-transitory computer readable medium having instructions stored thereon is disclosed. The instructions, when executed by at least one processor, cause at least one device to perform operations including generating a first interface including one or more sets of interface elements. The first interface allows selection of one interface element in each of the one or more sets of interface elements. The device further performs operations including obtaining the selected one interface element for each of the one or more sets of interface elements and a set of user preferences. Each of the selected one interface element is associated with the one or more factors including a tag and a semantic text. The device further performs operations including determining one or more opportunity areas based on the set of answers of the user data and identifying a plurality of content based on the one or more factors. The device further performs operations including generating a second interface. The second interface is comprised of one or more study features based on the one or more opportunity areas, the plurality of content, and the set of user preferences of the user data.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein.

DETAILED DESCRIPTION

Figure 1:
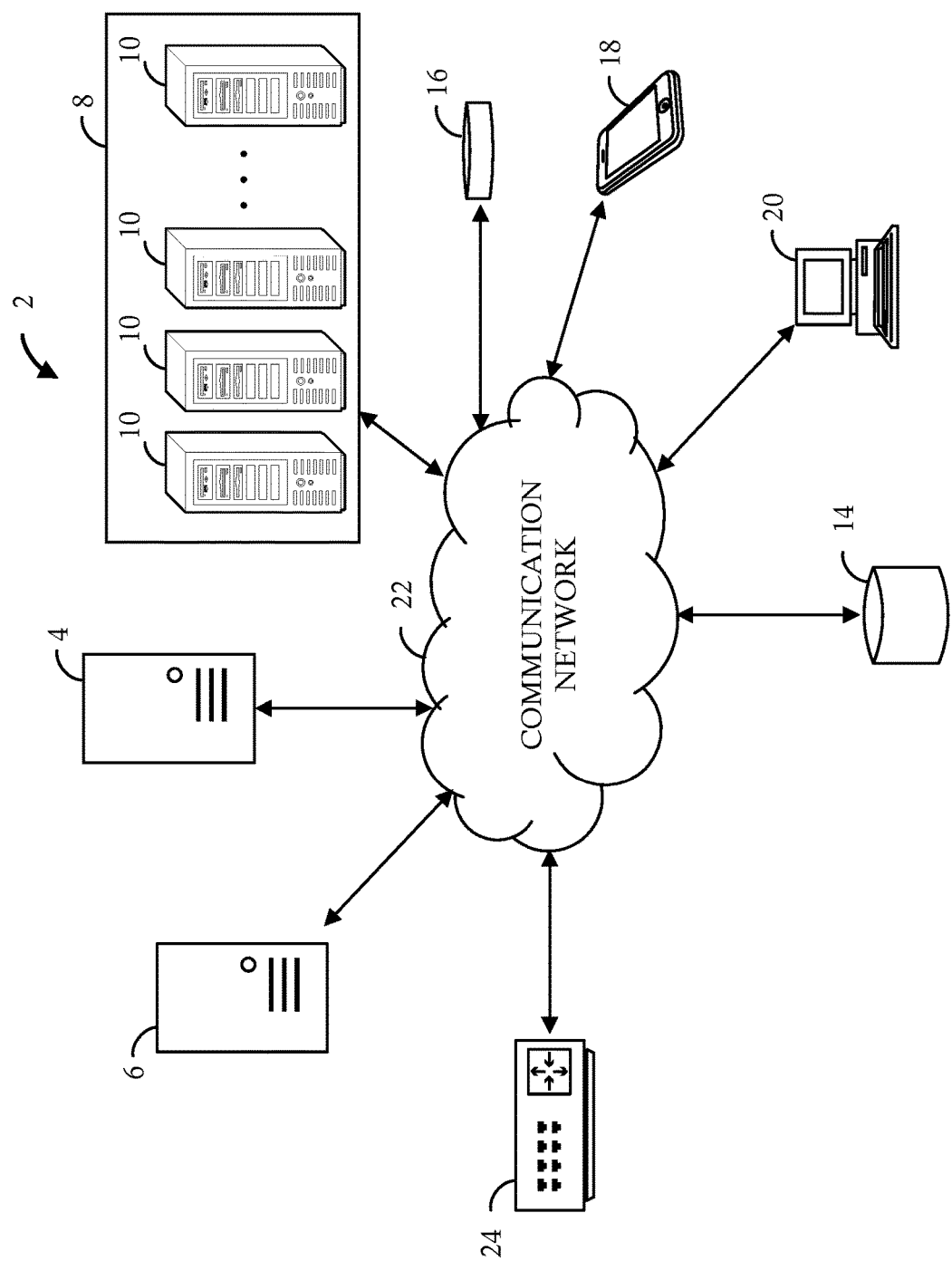
FIG. 1 illustrates a network environment configured to provide personalized interfaces including personalized interface content elements based on a personalized interface content plan, in accordance with some embodiments.

This description of the exemplary embodiments is intended to be read in connection with the accompanying drawings, which are to be considered part of the entire written description. Terms concerning data connections, coupling and the like, such as "connected" and "interconnected," and/or "in signal communication with" refer to a relationship wherein systems or elements are electrically connected (e.g., wired, wireless, etc.) to one another either directly or indirectly through intervening systems, unless expressly described otherwise. The term "operatively coupled" is such a coupling or connection that allows the pertinent structures to operate as intended by virtue of that relationship.

In the following, various embodiments are described with respect to the claimed systems as well as with respect to the claimed methods. Features, advantages, or alternative embodiments herein may be assigned to the other claimed objects and vice versa. In other words, claims for the systems may be improved with features described or claimed in the context of the methods. In this case, the functional features of the method are embodied by objective units of the systems. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

Furthermore, in the following, various embodiments are described with respect to methods and systems for generating personalized interface content plans. In various embodiments, a personalized interface content plan includes one or more interface features based on one or more opportunity areas, a plurality of content, and a set of user preferences.

In some embodiments, systems, and methods for generating a personalized interface content plan and/or a personalized interface based on a personalized interface content plan. One or more interactions between a user and an interface, such as an assessment interface are obtained. The one or more interactions may be representative of and/or responsive to an evaluation of user familiarity and/or comfort with one or more knowledge domains and/or sub-domains. For example, in some embodiments, one or more evaluation interfaces are configured to receive user responses (e.g., user selections, user feedback, etc.) to one or more assessments of knowledge within a domain and/or sub-domain.

In some embodiments, the user responses (e.g., interactions) are processed to identify one or more opportunity areas representative of portions of a knowledge domain and/or sub-domain that may require focused and/or additional review. A personalized interface content plan is generated based on the one or more opportunity areas, for example, in conjunction with one or more system and/or user preferences. The personalized interface content plan includes interface elements, templates, and/or requirements that are personalized to emphasize and/or include the one or more opportunity areas, such as personalized remedial content elements. The personalized interface content plan may include personalized interface elements configured to provide programmatic access to one or more portions of an interface and/or network environment containing user-relevant information, such as remedial information, corresponding to the one or more opportunity areas.

In some embodiments, the one or more opportunity areas and/or the content elements associated with one or more opportunity areas may be identified by utilizing one or more trained vector-pointer database models. A trained vector-pointer database model may include one or more models, such as language model, configured to operate on embeddings, for example, filtering embeddings on taxonomy and/or semantics of an underlying text.

In general, a trained function mimics cognitive functions that humans associate with other human minds. In particular, by training based on training data the trained function is able to adapt to new circumstances and to detect and extrapolate patterns.

In general, parameters of a trained function may be adapted by means of training. In particular, a combination of supervised training, semi-supervised training, unsupervised training, reinforcement learning and/or active learning may be used. Furthermore, representation learning (an alternative term is "feature learning") may be used. In particular, the parameters of the trained functions may be adapted iteratively by several steps of training.

In some embodiments, a trained function may include a neural network, a support vector machine, a decision tree, a Bayesian network, a clustering network, Qlearning, genetic algorithms and/or association rules, and/or any other suitable artificial intelligence architecture. In some embodiments, a neural network may be a deep neural network, a convolutional neural network, a convolutional deep neural network, etc. Furthermore, a neural network may be an adversarial network, a deep adversarial network, a generative adversarial network, etc.

In various embodiments, neural networks which are trained (e.g., configured or adapted) to generate a personalized interface content plan with remedial content, are disclosed. A neural network trained to generate a personalized interface content plan, may be referred to as a trained support vector model. A trained support vector model may be configured to receive a set of input data, such as a tag and/or semantic text, identify a set of opportunity areas, and select a set of content elements associated with the set of opportunity areas for inclusion in an interface generated according to the personalized interface content plan.

FIG. 1 illustrates a network environment 2 configured to provide personalized interfaces including personalized interface content elements based on a personalized interface content plan, in accordance with some embodiments. The network environment 2 includes a plurality of devices or systems configured to communicate over one or more network channels, illustrated as a network cloud 22. For example, in various embodiments, the network environment 2 may include, but is not limited to, a personalization computing device 4, a web server 6, a cloud-based engine 8 including one or more processing devices 10, a database 14, and/or one or more user computing devices 16, 18, 20 operatively coupled over the network 22. The personalization computing device 4, the web server 6, the processing device(s) 10, and/or the user computing devices 16, 18, 20 may each be a suitable computing device that includes any hardware or hardware and software combination for processing and handling information. For example, each computing device may include, but is not limited to, one or more processors, one or more field-programmable gate arrays (FPGAs), one or more application-specific integrated circuits (ASICs), one or more state machines, digital circuitry, and/or any other suitable circuitry. In addition, each computing device may transmit and receive data over the communication network 22.

In some embodiments, each of the personalization computing device 4 and the processing device(s) 10 may be a computer, a workstation, a laptop, a server such as a cloud-based server, or any other suitable device. In some embodiments, each of the processing devices 10 is a server that includes one or more processing units, such as one or more graphical processing units (GPUs), one or more central processing units (CPUs), and/or one or more processing cores. Each processing device 10 may, in some embodiments, execute one or more virtual machines. In some embodiments, processing resources (e.g., capabilities) of the one or more processing devices 10 are offered as a cloud-based service (e.g., cloud computing). For example, the cloud-based engine 8 may offer computing and storage resources of the one or more processing devices 10 to the personalization computing device 4.

In some embodiments, each of the user computing devices 16, 18, 20 may be a cellular phone, a smart phone, a tablet, a personal assistant device, a voice assistant device, a digital assistant, a laptop, a computer, or any other suitable device. In some embodiments, the web server 6 hosts one or more network environments, such as an e-commerce network environment. In some embodiments, the personalization computing device 4, the processing devices 10, and/or the web server 6 are operated by the network environment provider, and the user computing devices 16, 18, 20 are operated by users of the network environment. In some embodiments, the processing devices 10 are operated by a third party (e.g., a cloud-computing provider).

Although FIG. 1 illustrates three user computing devices 16, 18, 20, the network environment 2 may include any number of user computing devices 16, 18, 20. Similarly, the network environment 2 may include any number of the personalization computing device 4, the web server 6, the processing devices 10, and/or the databases 14. It will further be appreciated that additional systems, servers, storage mechanism, etc. may be included within the network environment 2. In addition, although embodiments are illustrated herein having individual, discrete systems, it will be appreciated that, in some embodiments, one or more systems may be combined into a single logical and/or physical system. For example, in various embodiments, one or more of the personalization computing device 4, the web server 6, the database 14, the user computing devices 16, 18, 20, and/or the router 24 may be combined into a single logical and/or physical system. Similarly, although embodiments are illustrated having a single instance of each device or system, it will be appreciated that additional instances of a device may be implemented within the network environment 2. In some embodiments, two or more systems may be operated on shared hardware in which each system operates as a separate, discrete system utilizing the shared hardware, for example, according to one or more virtualization schemes.

The communication network 22 may be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. The communication network 22 may provide access to, for example, the Internet.

Each of the user computing devices 16, 18, 20 may communicate with the web server 6 over the communication network 22. For example, each of the user computing devices 16, 18, 20 may be operable to view, access, and interact with a website, such as a knowledge-based website, hosted by the web server 6. The web server 6 may transmit user session data related to a user's activity (e.g., interactions) on the website. For example, a user may operate one of the user computing devices 16, 18, 20 to initiate a web browser that is directed to the website hosted by the web server 6. The user may, via the web browser, perform various operations such as obtaining predetermined interface and/or content elements determined by one or more preselected content plans, interacting with one or more assessment and/or input interface elements, obtaining customized interface elements, content elements, and/or assessment elements determined by one or more personalized interface content plans, etc. The website may capture these activities as user session data, and transmit the user session data to the personalization computing device 4 over the communication network 22. The website may also allow the user to interact with one or more of interface elements to perform specific operations, such as selecting one or more elements for further processing. In some embodiments, the web server 6 transmits user interaction data identifying interactions between the user and the website to the personalization computing device 4.

In some embodiments, the personalization computing device 4 may execute one or more models, processes, or algorithms, such as a machine learning model, deep learning model, statistical model, support vector model, etc., to generate a personalized interface content plan. The personalization computing device 4 may transmit the personalized interface content plan to the web server 6 over the communication network 22, and the web server 6 may display interface elements associated with the personalized interface content plan on the website to the user. For example, the web server 6 may display interface elements associated with the personalized interface content plan to the user on a knowledge-based interface configured to convey and/or assess user knowledge.

The personalization computing device 4 is further operable to communicate with the database 14 over the communication network 22. For example, the personalized interface content plan computing device 4 may store data to, and read data from, the database 14. The database 14 may be a remote storage device, such as a cloud-based server, a disk (e.g., a hard disk), a memory device on another application server, a networked computer, or any other suitable remote storage. Although shown remote to the personalization computing device 4, in some embodiments, the database 14 may be a local storage device, such as a hard drive, a non-volatile memory, or a USB stick. The personalization computing device 4 may store interaction data received from the web server 6 in the database 14. The personalization computing device 4 may also receive from the web server 6 user session data identifying events associated with browsing sessions and may store the user session data in the database 14.

In some embodiments, the personalization computing device 4 generates training data for a plurality of models (e.g., machine learning models, deep learning models, statistical models, algorithms, etc.) based on aggregation data, historical user session data, search data, assessment data, interaction data, etc. The personalization computing device 4 and/or one or more of the processing devices 10 may train one or more models based on corresponding training data. The personalization computing device 4 may store the models in a database, such as in the database 14 (e.g., a cloud storage database).

The models, when executed by the personalization computing device 4, allow the personalization computing device 4 to generate the personal interface content plan with remedial content. For example, the personalization computing device 4 may obtain one or more models from the database 14. The personalization computing device 4 may then receive, in real-time from the web server 6, a request to generate a personalized interface content plan and/or a personalized interface. In response to receiving one or more assessment interactions and/or aggregated assessment interactions, the personalization computing device 4 may execute one or more models to create a personalized interface content plan and/or a personalized interface.

In some embodiments, the personalization computing device 4 assigns the models (or parts thereof) for execution to one or more processing devices 10. For example, each model may be assigned to a virtual machine hosted by a processing device 10. The virtual machine may cause the models or parts thereof to execute on one or more processing units such as GPUs. In some embodiments, the virtual machines assign each model (or part thereof) among a plurality of processing units. Based on the output of the models, personalization computing device 4 may generate a personalized interface content plan.

Figure 2:
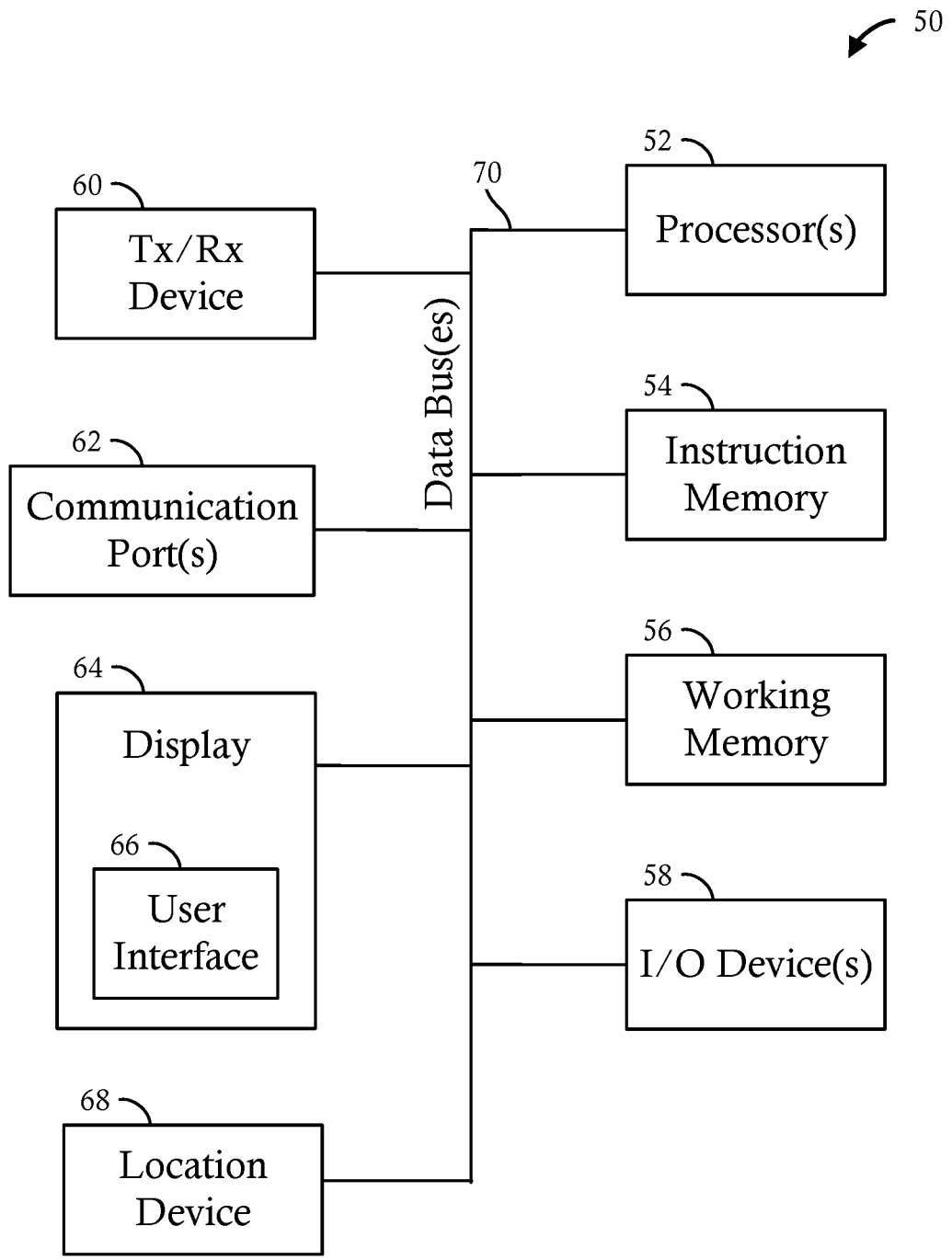
FIG. 2 illustrates block diagram of a computing device configured to implement one or more disclosed processes, in accordance with some embodiments.

FIG. 2 illustrates a block diagram of a computing device 50 configured to implement one or more disclosed processes, in accordance with some embodiments. In some embodiments, each of the personalization computing device 4, the web server 6, the one or more processing devices 10, the workstation(s) 12, and/or the user computing devices 16, 18, 20 in FIG. 1 may include the features shown in FIG. 2. Although FIG. 2 is described with respect to certain components shown therein, it will be appreciated that the elements of the computing device 50 may be combined, omitted, and/or replicated. In addition, it will be appreciated that additional elements other than those illustrated in FIG. 2 may be added to the computing device.

As shown in FIG. 2, the computing device 50 may include one or more processors 52, an instruction memory 54, a working memory 56, one or more input/output devices 58, a transceiver 60, one or more communication ports 62, a display 64 with a user interface 66, and an optional location device 68, all operatively coupled to one or more data buses 70. The data buses 70 allow for communication among the various components. The data buses 70 may include wired, or wireless, communication channels.

The one or more processors 52 may include any processing circuitry operable to control operations of the computing device 50. In some embodiments, the one or more processors 52 include one or more distinct processors, each having one or more cores (e.g., processing circuits). Each of the distinct processors may have the same or different structure. The one or more processors 52 may include one or more central processing units (CPUs), one or more graphics processing units (GPUs), application specific integrated circuits (ASICs), digital signal processors (DSPs), a chip multiprocessor (CMP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The one or more processors 52 may also be implemented by a controller, a microcontroller, an application specific integrated circuit (ASIC), a field programmable gate array (FPGA), a programmable logic device (PLD), etc.

In some embodiments, the one or more processors 52 are configured to implement an operating system (OS) and/or various applications. Examples of an OS include, for example, operating systems generally known under various trade names such as Apple macOS™, Microsoft Windows™, Android™, Linux™, and/or any other proprietary or open-source OS. Examples of applications include, for example, network applications, local applications, data input/output applications, user interaction applications, etc.

The instruction memory 54 may store instructions that are accessed (e.g., read) and executed by at least one of the one or more processors 52. For example, the instruction memory 54 may be a non-transitory, computer-readable storage medium such as a read-only memory (ROM), an electrically erasable programmable read-only memory (EEPROM), flash memory (e.g. NOR and/or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, a removable disk, CD-ROM, any non-volatile memory, or any other suitable memory. The one or more processors 52 may be configured to perform a certain function or operation by executing code, stored on the instruction memory 54, embodying the function or operation. For example, the one or more processors 52 may be configured to execute code stored in the instruction memory 54 to perform one or more of any function, method, or operation disclosed herein.

Additionally, the one or more processors 52 may store data to, and read data from, the working memory 56. For example, the one or more processors 52 may store a working set of instructions to the working memory 56, such as instructions loaded from the instruction memory 54. The one or more processors 52 may also use the working memory 56 to store dynamic data created during one or more operations. The working memory 56 may include, for example, random access memory (RAM) such as a static random access memory (SRAM) or dynamic random access memory (DRAM), Double-Data-Rate DRAM (DDR-RAM), synchronous DRAM (SDRAM), an EEPROM, flash memory (e.g. NOR and/or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, a removable disk, CD-ROM, any non-volatile memory, or any other suitable memory. Although embodiments are illustrated herein including separate instruction memory 54 and working memory 56, it will be appreciated that the computing device 50 may include a single memory unit configured to operate as both instruction memory and working memory. Further, although embodiments are discussed herein including non-volatile memory, it will be appreciated that computing device 50 may include volatile memory components in addition to at least one non-volatile memory component.

In some embodiments, the instruction memory 54 and/or the working memory 56 includes an instruction set, in the form of a file for executing various methods, such as methods for generating personalized interface content plans, as described herein. The instruction set may be stored in any acceptable form of machine-readable instructions, including source code or various appropriate programming languages. Some examples of programming languages that may be used to store the instruction set include, but are not limited to: Java, JavaScript, C, C++, C#, Python, Objective-C, Visual Basic, .NET, HTML, CSS, SQL, NoSQL, Rust, Perl, etc. In some embodiments a compiler or interpreter is configured to convert the instruction set into machine executable code for execution by the one or more processors 52.

The input-output devices 58 may include any suitable device that allows for data input or output. For example, the input-output devices 58 may include one or more of a keyboard, a touchpad, a mouse, a stylus, a touchscreen, a physical button, a speaker, a microphone, a keypad, a click wheel, a motion sensor, a camera, and/or any other suitable input or output device.

The transceiver 60 and/or the communication port(s) 62 allow for communication with a network, such as the communication network 22 of FIG. 1. For example, if the communication network 22 of FIG. 1 is a cellular network, the transceiver 60 is configured to allow communications with the cellular network. In some embodiments, the transceiver 60 is selected based on the type of the communication network 22 the computing device 50 will be operating in. The one or more processors 52 are operable to receive data from, or send data to, a network, such as the communication network 22 of FIG. 1, via the transceiver 60.

The communication port(s) 62 may include any suitable hardware, software, and/or combination of hardware and software that is capable of coupling the computing device 50 to one or more networks and/or additional devices. The communication port(s) 62 may be arranged to operate with any suitable technique for controlling information signals using a desired set of communications protocols, services, or operating procedures. The communication port(s) 62 may include the appropriate physical connectors to connect with a corresponding communications medium, whether wired or wireless, for example, a serial port such as a universal asynchronous receiver/transmitter (UART) connection, a Universal Serial Bus (USB) connection, or any other suitable communication port or connection. In some embodiments, the communication port(s) 62 allows for the programming of executable instructions in the instruction memory 54. In some embodiments, the communication port(s) 62 allow for the transfer (e.g., uploading or downloading) of data, such as machine learning model training data.

In some embodiments, the communication port(s) 62 are configured to couple the computing device 50 to a network. The network may include local area networks (LAN) as well as wide area networks (WAN) including without limitation Internet, wired channels, wireless channels, communication devices including telephones, computers, wire, radio, optical and/or other electromagnetic channels, and combinations thereof, including other devices and/or components capable of/associated with communicating data. For example, the communication environments may include in-body communications, various devices, and various modes of communications such as wireless communications, wired communications, and combinations of the same.

In some embodiments, the transceiver 60 and/or the communication port(s) 62 are configured to utilize one or more communication protocols. Examples of wired protocols may include, but are not limited to, Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, etc. Examples of wireless protocols may include, but are not limited to, the Institute of Electrical and Electronics Engineers (IEEE) 802.xx series of protocols, such as IEEE 802.11a/b/g/n/ac/ag/ax/be, IEEE 802.16, IEEE 802.20, GSM cellular radiotelephone system protocols with GPRS, CDMA cellular radiotelephone communication systems with 1xRTT, EDGE systems, EV-DO systems, EV-DV systems, HSDPA systems, Wi-Fi Legacy, Wi-Fi 1/2/3/4/5/6/6E, wireless personal area network (PAN) protocols, Bluetooth Specification versions 5.0, 6, 7, legacy Bluetooth protocols, passive or active radio-frequency identification (RFID) protocols, Ultra-Wide Band (UWB), Digital Office (DO), Digital Home, Trusted Platform Module (TPM), ZigBee, etc.

The display 64 may be any suitable display and may display the user interface 66. The user interfaces 66 may enable user interaction with the personalized interface content plan. For example, the user interface 66 may be a user interface for an application of a network environment operator that allows a user to view and interact with the operator's website. In some embodiments, a user may interact with the user interface 66 by engaging the input-output devices 58. In some embodiments, the display 64 may be a touchscreen, where the user interface 66 is displayed on the touchscreen.

The display 64 may include a screen such as, for example, a Liquid Crystal Display (LCD) screen, a light-emitting diode (LED) screen, an organic LED (OLED) screen, a movable display, a projection, etc. In some embodiments, the display 64 may include a coder/decoder, also known as Codecs, to convert digital media data into analog signals. For example, the visual peripheral output device may include video Codecs, audio Codecs, or any other suitable type of Codec.

The optional location device 68 may be communicatively coupled to a location network and operable to receive position data from the location network. For example, in some embodiments, the location device 68 includes a GPS device configured to receive position data identifying a latitude and longitude from one or more satellites of a GPS constellation. As another example, in some embodiments, the location device 68 is a cellular device configured to receive location data from one or more localized cellular towers. Based on the position data, the computing device 50 may determine a local geographical area (e.g., town, city, state, etc.) of its position.

In some embodiments, the computing device 50 is configured to implement one or more modules or engines, each of which is constructed, programmed, configured, or otherwise adapted, to autonomously carry out a function or set of functions. A module/engine may include a component or arrangement of components implemented using hardware, such as by an application specific integrated circuit (ASIC) or field-programmable gate array (FPGA), for example, or as a combination of hardware and software, such as by a microprocessor system and a set of program instructions that adapt the module/engine to implement the particular functionality, which (while being executed) transform the microprocessor system into a special-purpose device. A module/engine may also be implemented as a combination of the two, with certain functions facilitated by hardware alone, and other functions facilitated by a combination of hardware and software. In certain implementations, at least a portion, and in some cases, all, of a module/engine may be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each module/engine may be realized in a variety of physically realizable configurations and should generally not be limited to any particular implementation exemplified herein, unless such limitations are expressly called out. In addition, a module/engine may itself be composed of more than one sub-modules or sub-engines, each of which may be regarded as a module/engine in its own right. Moreover, in the embodiments described herein, each of the various modules/engines corresponds to a defined autonomous functionality; however, in other contemplated embodiments, each functionality may be distributed to more than one module/engine. Likewise, in other contemplated embodiments, multiple defined functionalities may be implemented by a single module/engine that performs those multiple functions, possibly alongside other functions, or distributed differently among a set of modules/engines than specifically illustrated in the embodiments herein.

Identification of remedial content interface elements may be burdensome and time consuming for users, especially if there is no method of generating remedial content unique to the user. Typically, a user may locate information regarding remedial content by navigating a browse structure, sometimes referred to as a "browse tree," in which interface pages or elements are arranged in a predetermined hierarchy. Such browse trees typically include multiple hierarchical levels, requiring users to navigate through several levels of browse nodes or pages to arrive at an interface page of interest. Thus, the user frequently has to perform numerous navigational steps to arrive at a page containing information regarding remedial content unique to the user.

Systems including trained support vector models, as disclosed herein, significantly reduce this problem, allowing generation of personalized interface content plans including remedial content uniquely tailored to content associated with a particular user's specific topics with fewer, or in some case no, active steps. For example, in some embodiments described herein, when a user is presented with an interface generated based on a personalized interface content plan, one or more interface elements include, or are in the form of, a link to an interface page for remedial content unique to the user. The included interface elements thus serve as a programmatically selected navigational shortcut to an interface page, allowing a user to bypass the navigational structure of the browse tree. Beneficially, programmatically identifying remedial content unique to each user and presenting a user with navigations shortcuts to these tasks may improve the speed of the user's navigation through an electronic interface, rather than requiring the user to page through multiple other pages to locate the remedial content unique to each user via the browse tree or via a search function. This may be particularly beneficial for computing devices with small screens, where fewer interface elements are displayed to a user at a time and thus navigation of larger volumes of data is more difficult.

Figure 3:
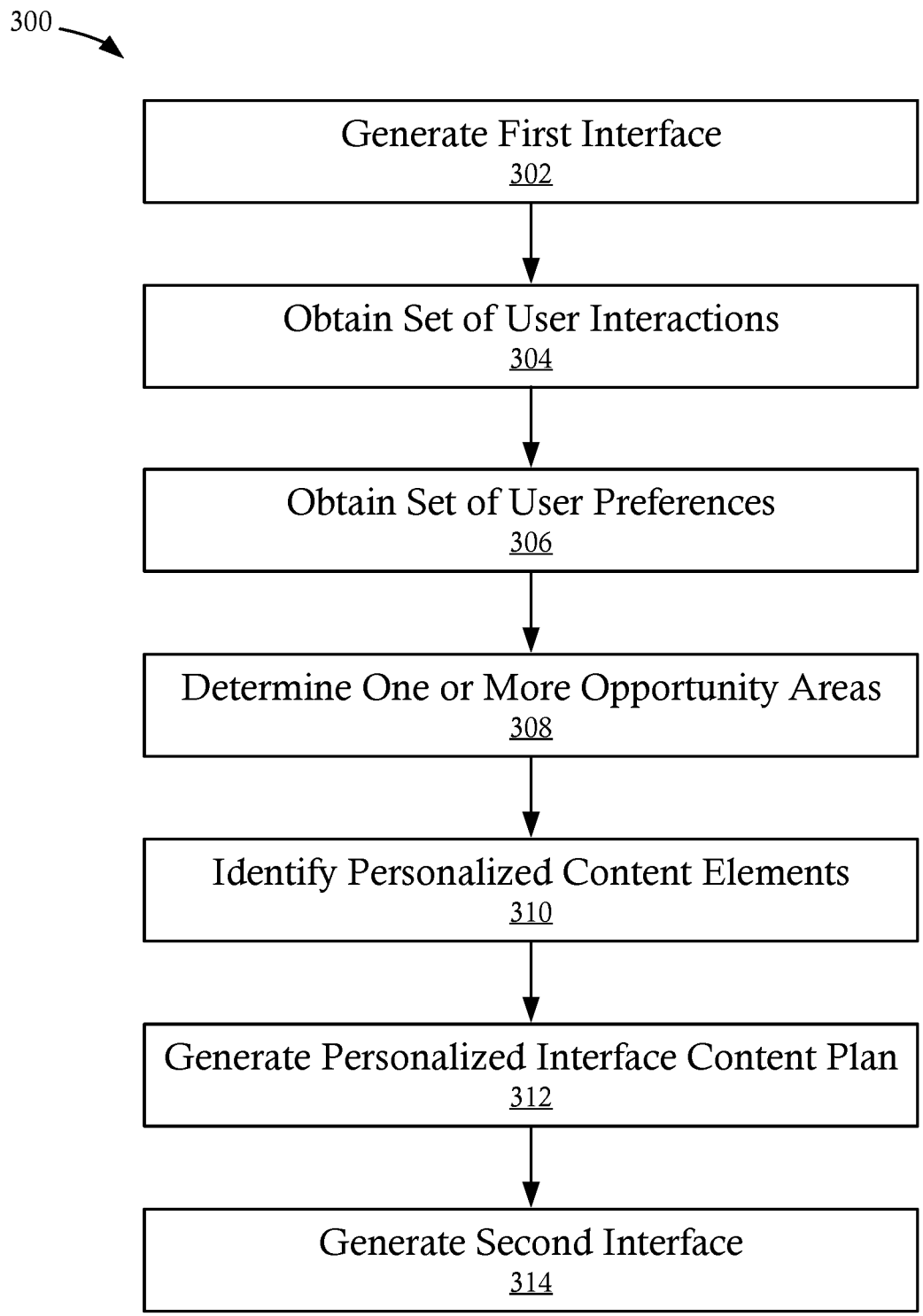
FIG. 3 is a flowchart illustrating a personalized interface generation method, in accordance with some embodiments.
Figure 4:
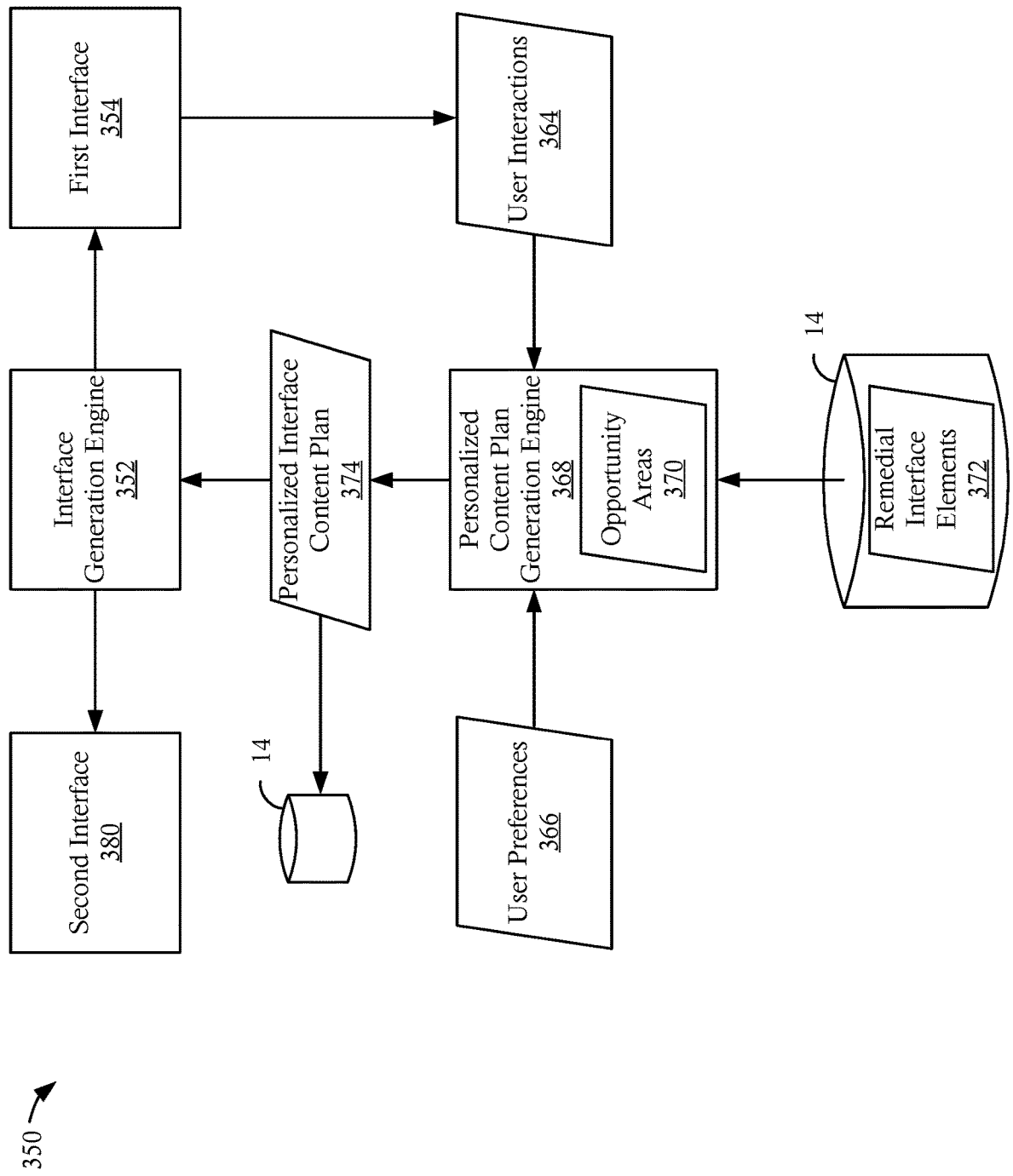
FIG. 4 is a process flow illustrating various portions of a system configured to implement the personalized interface generation method of FIG. 3, in accordance with some embodiments.

FIG. 3 is a flowchart illustrating a personalized interface generation method 300, in accordance with some embodiments. FIG. 4 is process flow 350 illustrating various portions of a system configured to implement the personalized interface generation method 300, in accordance with some embodiments. At step 302, a first interface 354 is generated and presented to a user, for example, via a user device 16. The first interface 354 may be generated any suitable engine, module, etc., such as an interface generation engine 352, implemented by one or more devices, such as the web server 6, the processing device 10, etc. The first interface 354 may include one or more interface elements representative of and/or related to one or more concepts, facts, and/or other information associated with one or more knowledge domains and/or knowledge sub-domains.

As used herein, the term knowledge domain may refer to a class of knowledge having one or more related topics and/or subjects. For example, in various embodiments, a knowledge domain may include one or more of a broad knowledge domain (e.g., a medical domain, a legal domain, etc.), a narrower sub-domain within a broader knowledge domain (e.g., a nursing domain within a broader medical domain, a tax law domain within a broader legal domain, etc.), a specialized domain (e.g., obstetrics nursing domain, U.S. corporate tax domain), an evaluation-defined domain (e.g., a knowledge domain representative of one or more subjects covered by or included in a particular evaluation, certification, etc.), and/or any other suitable defined class of knowledge. Further, as used herein, the term knowledge sub-domain refers to a subset and/or portion of a broader knowledge domain having a specific topic and/or focus within the broader knowledge domain. Although specific embodiments are discussed herein, it will be appreciated that any suitable knowledge domain amenable to factual evaluation may be embodied in the interfaces and/or personalized interface content plans disclosed herein.

Figure 5:
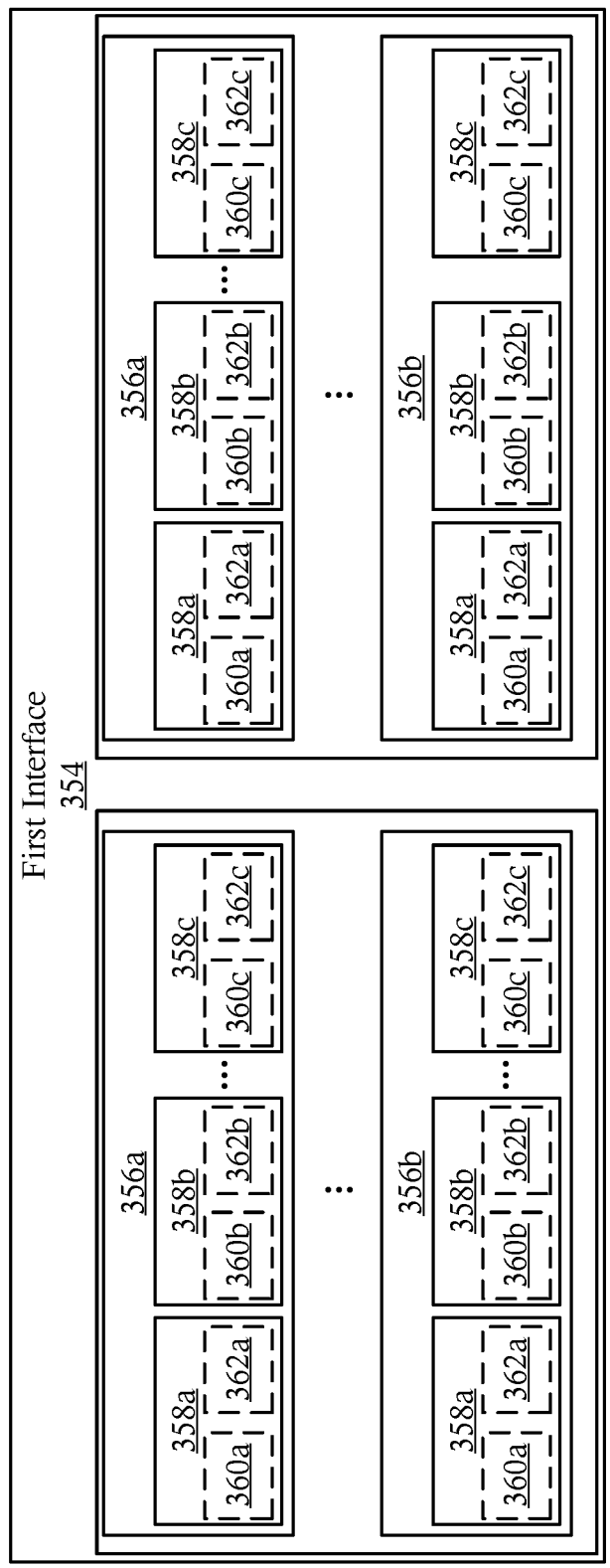
FIG. 5 illustrates a first interface including one or more assessment interface elements, in accordance with some embodiments.

In some embodiments, the first interface 354 includes an assessment interface having one or more assessment interface elements 356a-356d (collectively "assessment interface elements 356") related to and/or representative of a knowledge domain. For example, FIG. 5 illustrates a first interface including assessment interface elements 356, in accordance with some embodiments. Each of the assessment interface elements 356 may include a set of selectable sub-elements 358a-358c (collectively "selectable sub-elements 358") configured to receive user input responsive to one or more prompts provided by a corresponding one of the assessment interface elements 356. For example, the assessment interface elements 356 may define a baseline assessment configured to identify and/or determine a user's knowledge within one or more knowledge domains. In some embodiments, the first interface 354 includes a plurality of assessment interface elements 356 defining prompts (e.g., questions) each with a corresponding set of selectable sub-elements 358 (e.g., answer choices). Each of the sets of selectable sub-elements 358 may include one or more selectable and/or interactive interface elements, such as one or more selectable multiple choice options, true or false options, text box for receipt of text-based responses, etc. The first interface 354 may allow for the selection of one or more selectable sub-elements 358 for each of the assessment interface elements 356.

In some embodiments, each of assessment interface elements 356 and/or each of the selectable sub-elements 358 is associated with one or more parameters. For example, the one or more parameters may include a tag 360a-360c (collectively "tags 360"), a stored semantic text representation 362a-362c (collectively "semantic representations 362") of a corresponding one of the selectable sub-elements 358, etc. Although specific embodiments are discussed herein, it will be appreciated that any suitable parameters, tags 360, semantic representations 362, etc. may be associated with each of the assessment interface elements 356 and/or the selectable sub-elements 358.

At step 304, a set of user interactions 364 for at least one of the selectable sub-elements 358 is obtained for each of the assessment interface elements 356. User selections may include, but are not limited to, selection of at least one of the selectable sub-elements 358, completion of a text box or other open ended interface element, omission of a selection of any of the selectable sub-elements 358, and/or any other suitable selection or interaction. In some embodiments, user interactions may be obtained over two or more user sessions and/or over two or more first interfaces 354. For example, a user may interact with multiple first interfaces 354 including multiple sets of assessment interface elements 356 during one or more user sessions. The user interactions for each of the user sessions may be aggregated to define a set of user interactions for all presented assessment interface elements 356.

At step 306, a set of user preferences 366 is obtained. In some embodiments, the set of user preferences 366 may include data defining user preferences related to periods of interaction with an interface, such as a number of days a week a user is available to interact with a knowledge-based interface, a preferred time duration per session, a preferred time duration per date, day, week, month year, etc. of a user's availability, the types of material a user prefers, etc. The set of user preferences 366 may further include interface preferences utilized to select the type and/or presentation of certain interface content elements. User preferences 366 may be obtained directly, e.g., through direct input received from a user, obtained from a data storage mechanism, etc., and/or indirectly, e.g., derived from user interactions with one or more knowledge-based interfaces. Although specific embodiments are discussed herein, it will be appreciated that any suitable user preferences may be included within the set of user preferences 366.

At step 308, one or more opportunity areas 370 are determined based on the set of user interactions 364, e.g., based on the selection of one or more selectable sub-elements 358 for each of the assessment interface elements 356. In some embodiments, opportunity areas 370 are representative of sub-domains and/or categories within a knowledge domain, associated with interface elements and/or content that may be selected for inclusion in a personalized interface content plan, that are personalized to a user's needs and/or requirements. Opportunity areas 370 may be representative of gaps within a user's knowledge and/or areas of focus for review to be included within a personalized interface content plan. For example, within a knowledge domain related to a particular evaluation and/or certification, opportunity areas 370 may reflect subjects covered by the evaluation that have not been adequately mastered by a user.

In some embodiments, each of the opportunity areas 370 are identified based on a set of selected selectable sub-elements 358 for each of the assessment interface elements 356. For example, in some embodiments, selection of (e.g., user interactions with) one or more of the selectable sub-elements 358 for each of the assessment interface elements 356 may be tracked (e.g., user interactions 364). A determination may be made whether the one or more selected selectable sub-elements 358 represent expected (e.g., correct) or unexpected (e.g., incorrect) selections for the corresponding one of the assessment interface elements 356. The determination may be made by any suitable system, engine, module, etc., such as, for example, a personalized content plan generation engine 372. The determination may be based on any suitable criteria, such as, for example, comparison to a set of expected responses, semantic analysis of received responses, etc. In some embodiments, when one of the assessment interface elements 356 includes no selections (e.g., the corresponding assessment interface element was skipped or no answer was provided), the user interactions 364 may classify the missing interactions as an unexpected selection for the corresponding assessment interface element.

In some embodiments, one or more knowledge sub-domains (e.g., topics, categories, specific facts, etc.) are associated with each of the assessment interface elements 356 and/or each of the selectable sub-elements 358. The one or more knowledge sub-domains associated with each of the assessment interface elements 356 may be identified based on one or more parameters, such as one or more tags 360, one or more semantic representations 362, etc., associated with the assessment interface elements 356 and/or the selectable sub-elements 358 of a corresponding one of the assessment interface elements. One or more opportunity areas 370 may be identified based on the knowledge sub-domains associated with the assessment interface elements 356 having unexpected (e.g., incorrect) selections. For example, the assessment interface elements 356 having unexpected selections may be tracked and a count of the unexpected selections for each knowledge sub-domain may be generated. A knowledge sub-domain associated with one or more assessment interface elements 356 may be identified as an opportunity area 370 when one or more unexpected selections are identified for the corresponding assessment interface elements 356.

In some embodiments, an opportunity area 370 may be identified when two or more assessment interface elements 356 associated with the same and/or similar knowledge sub-domains have unexpected selections. For example, an opportunity area 370 may be identified when the number of assessment interface elements 356 associated with the same and/or similar knowledge sub-domain and having an unexpected selection exceeds a predetermined threshold. As another example, the identification of opportunity areas 370 may be based on a relative number of unexpected (e.g., incorrect) selections related to a knowledge sub-domain. As one non-limiting example, when there are multiple unexpected selections for assessment interface elements 356 directed to different knowledge sub-domains, one or more opportunity areas 370 may be identified for knowledge sub-domains having the largest number of assessment interface elements 356 having unexpected selections. The knowledge sub-domains associated with assessment interface elements 356 having unexpected selections may be ranked based on a corresponding number of unexpected selections and only a set of the N highest ranked topics and/or categories may be identified as opportunity areas 370.

In some embodiments, opportunity areas 370 may be selected and/or identified based on a likelihood of the opportunity area 370 being part of an evaluation. For example, an evaluation may have a statistical likelihood that a given topic and/or category within a knowledge domain, e.g., a sub-domain or element of a sub-domain, will be represented during the evaluation and/or may have a percentage of the evaluation devoted to a specific knowledge sub-domain or combination of knowledge sub-domains. Some knowledge sub-domains may appear more frequently, have a higher weighting, and/or otherwise have increased relevancy for an evaluation as compared to other knowledge sub-domains. When one or more assessment interface elements 356 are directed to a knowledge sub-domain having a higher likelihood of being represented during an evaluation above a predetermined threshold, a knowledge sub-domain having a higher weighting, and/or a higher significance with respect to an evaluation, an opportunity area 370 may be identified based off a single unexpected selection for any one assessment interface element 356. Alternatively, when one or more assessment interface elements 356 are directed to a knowledge sub-domain having a lower likelihood of being represented during an evaluation, lower weighting, and/or lower significance, an opportunity area 370 may be identified only for multiple unexpected selections for two or more of the corresponding assessment interface elements 356. As used herein, the terms higher and/or lower may represent absolute values (e.g., a higher probability being defined as a probability above or equal to a predetermined threshold and a lower probability being defined as a probability below the predetermined threshold) and/or relative values (e.g., a higher weight be defined as a weight ranked in the top N weights and a lower weight being defined as a weight ranked outside of the top N weights for each knowledge sub-domain). It will be appreciated that the terms higher and/or lower may be defined based on the corresponding evaluation, user preferences, etc.

In some embodiments, a limited (e.g., predetermined) number of opportunity areas 370 may be selected and/or identified for inclusion in a personalized interface content plan and/or a personalized interface. For example, a personalized interface content plan may have a predetermined number of slots M capable of storing an opportunity area 370. Opportunity areas 370 may be identified to fill the predetermined number of slots based on one or more criteria, such as, for example, a relevance determination. Relevance determinations may be related to user relevance, evaluation relevance, and/or any other suitable relevance criteria.

In some embodiments, each of a set of potential opportunity area is associated with one or more knowledge domains and/or sub-domains. Similarly, each of the assessment interface elements 356 and/or the selectable sub-elements 358 may also be associated with one or more knowledge domains and/or sub-domains. Personalized opportunity areas may be determined by matching knowledge domains and/or sub-domains associated with an opportunity area and the assessment interface elements 356. In some embodiments, matching between the knowledge domains and/or sub-domains does not need to be exact. For example, matching may include similarly related sub-domains that have been predefined and/or pre-associated to provide accurate and relevant opportunity areas. In some embodiments, one or more opportunity areas 370 may be identified based on one or more categories, tags, semantic elements, etc. preassigned to assessment interface elements 356 and/or selectable sub-elements 358. In some embodiments, one or more opportunity areas may be determined by comparing semantic text of the assessment interface elements 356 and/or the selectable sub-elements 358 through vector pointer database retrieval.

Figure 6:
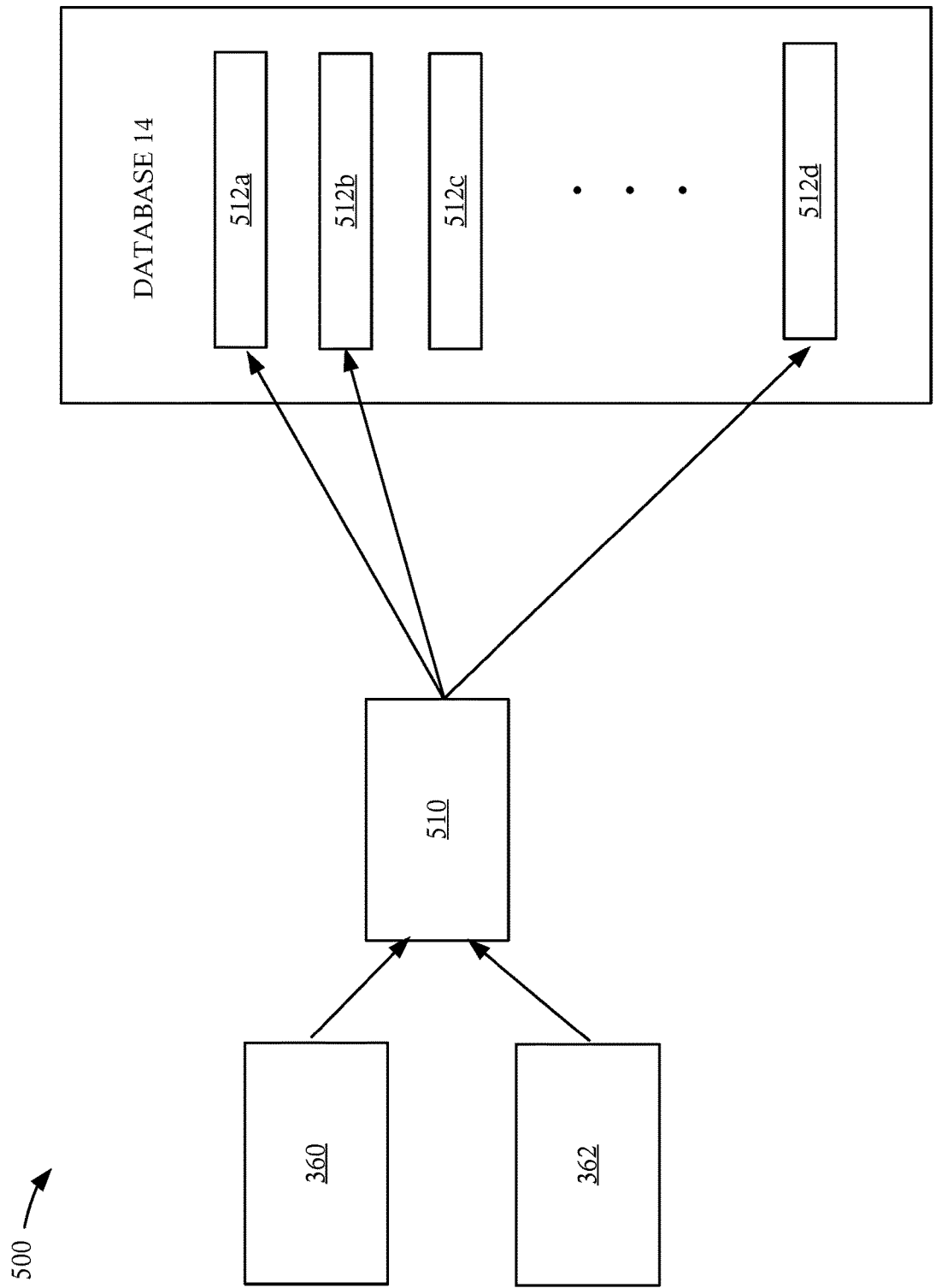
FIG. 6 illustrates a vector pointer database retrieval process, in accordance with some embodiments.

FIG. 6 illustrates a vector pointer database retrieval process 500, in accordance with some embodiments. In some embodiments, one or more parameters, such as one or more tags 360 and/or one or more semantic texts 362, are received by a vector generation and comparison engine 510. The vector generation and comparison engine 510 generates vector representations (e.g., embedding representations) of the received parameters and compares the vector representations to opportunity areas 370 and/or content elements 512a-512d (collectively "content elements 512"). Each of the content elements 512 are associated with at least one opportunity area 370 such that identification of one or more opportunity areas 370 may inherently identify one or more content elements 512 or, inversely, identification of one or more content elements 512 may inherently identify one or more opportunity areas 370. Vector representations may be generated using one or more language models and/or embedding generation models filtered on taxonomy.

At step 310, a set of personalized interface elements is selected for inclusion in a personalized interface content plan. For example, one or more remedial content elements 386a-386c (collectively "remedial content elements 386") associated with one or more of the opportunity areas 370 may be identified for inclusion in a personalized interface content plan. In some embodiments, the set of personalized interface elements may be identified based on the one or more parameters associated with the assessment interface elements 356, such as, for example one or more parameters associated with one or more unexpected selectable sub-elements 358. The set of remedial content elements 386 (and the corresponding set of personalized interface elements) may include, but is not limited to, text-based content elements (e.g., one or more questions, books, flashcards, explanations, excerpts, etc.), audiovisual content (e.g., video files, audio files, etc.), and/or any other suitable content element format. In some embodiments, the remedial content elements 386 may be stored in a database, such as, for example, database 14.

In some embodiments, one or more parameters associated with the assessment interface elements 356 are used to select sets of remedial content elements 386, for example, by applying a vector pointer database retrieval, as discussed above. The sets of remedial content elements 386 may include, but are not limited to, text-based interface elements (such as questions, answers, explanations, books, excerpts, etc.), audiovisual elements (e.g., audio readings, videos, etc.), mixed-media elements (e.g., flashcards, combined text and audiovisual works), etc. In addition, user preferences 366 may be provided prior to, concurrently, and/or after selecting one or more of the selectable sub-elements 358 for one or more assessment interface elements 356.

In some embodiments, the one or more parameters may include tags 360, semantic text 362, and/or any other suitable parameter. Certain parameters may be associated with the entirety of a content element (e.g., video, a book, etc.) and/or a relevant portion of a content element. For example, a referenced content element may correspond only to a smaller subsection of a long video, book, textual element, etc. In some embodiments, retrieval of only a relevant portion of a desired content element may be obtained. For example, a textual representation such as a transcription of a video, the text of a book, etc., is obtained, sectioned into predetermined portions, and stored in the database 14. Content elements representative of portions of a larger content element may be retrieved by utilizing tags 360 and/or comparisons of the semantic text as discussed above 362. In some embodiments, semantic comparisons may be provided by using language models embeddings filtered on the semantics of the text, such as, for example, one or more open source language models (e.g., one or more of a Bidirectional Encoder Representations from Transformers (BERT) model, a generative pre-trained transformer (GPT) model, a Word2Vec model, a Global Vectors for Word Representation (GloVe) model), a closed-source model, etc. One or more of the selected language models may be fine-tuned to better align with one or more specific semantics of analyzes text. One or more language models may be selected based on suitable factors, such as performance targets, available computational resources, nature of content elements, etc.

Figure 7:
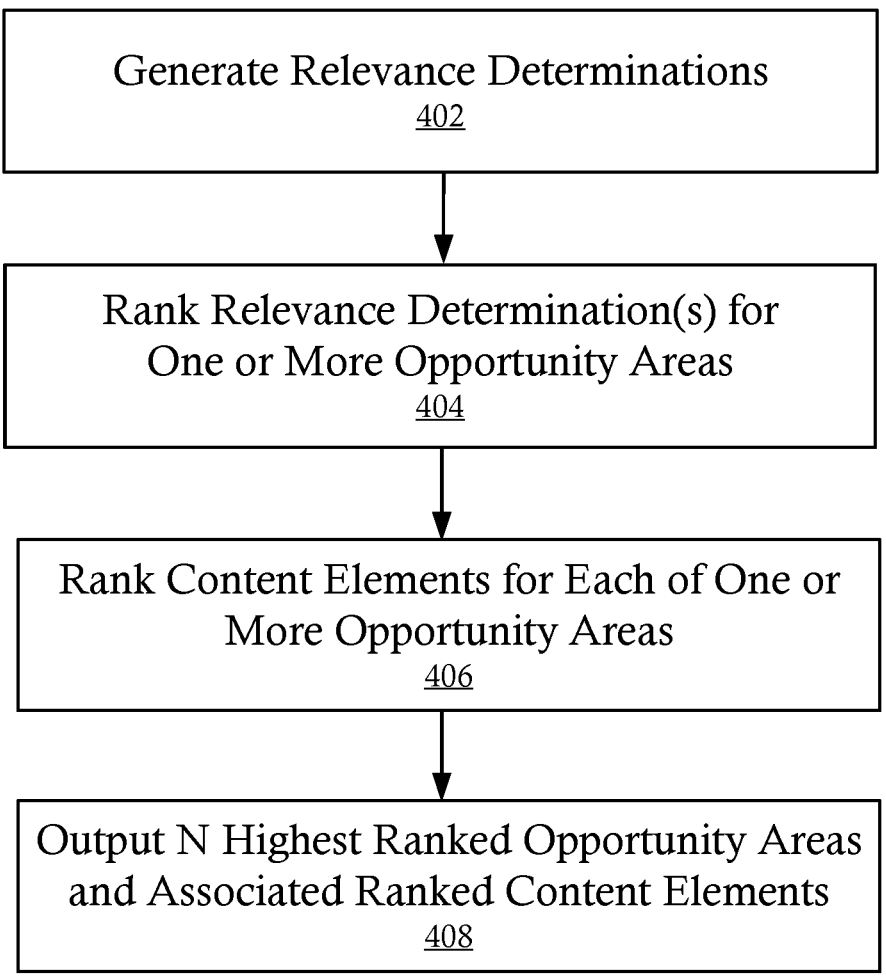
FIG. 7 is a flowchart illustrating a remedial content selection method, in accordance with some embodiments.

FIG. 7 is a flowchart illustrating a remedial content selection method 400, in accordance with some embodiments. At step 402, a relevance determination may be generated for each of the one or more opportunity areas 370 and/or for each remedial content element in a set of remedial content elements 386 associated with each of the one or more opportunity areas 370. For example, a relevance determination may be based on percentiles of a likelihood knowledge sub-domain associated with one of the opportunity areas 370 is included in an evaluation. A higher percentile of likelihood, a higher a ranking of a relevance determination for the related opportunity area 370. As another example, relevance determinations may be generated for each remedial content element in a set of remedial content elements 386 associated with one of the opportunity areas based on a number of unexpected responses for assessment interface elements 356 related to (e.g., having similar tags and/or semantic texts) the corresponding one of the remedial content elements 386. Relevance determinations may be generated based on user preferences 366, user interactions 364, and/or any other suitable data.

In some embodiments, a relevance determination may be based, at least in part, on a correlation between one or more opportunity areas 370 and one or more user interactions 368 providing an unexpected response to one or more assessment interface elements 356. For example, each of the assessment interface elements 356 (and/or the selectable sub-elements 358 associated therewith) have a related content categories and/or content parameters associated therewith. A relevance determination may be generated based on a correspondence between the parameters (e.g., tags 360, semantic text 362, etc.) of the assessment interface elements 356. One or more of the parameters may identify a corresponding knowledge sub-domain within a knowledge domain.

In some embodiments, a relevance determination may be based, at least in part, on one or more user preferences 366. For example, a set of user preferences 366 may include one or more knowledge sub-domains identified as areas of focus and/or concern. One or more opportunity areas 370 may be identified based on a correlation between knowledge sub-domains identified in the user preferences 366 and the knowledge sub-domains associated with each of the opportunity areas 370. As another example, a set of user preferences 366 may include an interface interaction time limitation resulting in opportunity areas 370 having a higher number of unexpected responses having a higher relevance, so that additional interface elements (and therefore additional interface interaction time) is devoted to opportunity areas 370 representing larger knowledge gaps.

At step 404, each of the one or more opportunity areas 370 are ranked based on the generated relevance determinations, e.g., from highest to lowest relevance. The opportunity areas may be ranked using any suitable ranking framework, such as, for example, a simple ranking framework, a trained ranking model, etc. Although embodiments are discussed herein including a ranking from highest to lowest relevance, it will be appreciated that any suitable ranking of the opportunity areas may be utilized by the disclosed systems and methods.

At step 406, each of the remedial content elements in a set of remedial content elements 386 associated with each of the one or more opportunity areas 370 are ranked based on the generated relevance determinations for the remedial content elements. The remedial content elements 386 may be ranked using any suitable ranking framework, such as, for example, a simple ranking framework, a trained ranking model, etc. Although embodiments are discussed herein including a ranking from highest to lowest relevance, it will be appreciated that any suitable ranking of the remedial content elements may be utilized by the disclosed systems and methods.

At step 408, a set of personalized interface elements is generated by outputting a set of the N highest ranked opportunity areas 370 and associated sets of remedial content elements for each of the N highest ranked opportunity areas 370. In some embodiments, a set of personalized interface elements may be generated by selecting sets of remedial content elements 386 associated with the ranked opportunity areas 370 in sequential, descending rank order. For example, a first set of remedial content elements 386 associated with a highest ranked opportunity area 370 may first be selected for inclusion in a set of personalized interface elements, a second set of remedial content elements 386 associated with the second-highest ranked opportunity area 370 may subsequently be selected for inclusion, etc., until remedial content elements have been selected for each of the N highest ranked opportunity areas 370 and/or a predetermined number of remedial content elements 386 has been selected.

In some embodiments, a predetermined maximum number of remedial content elements 386 may be selected for each of the one or more opportunity areas. For example, a highest ranked opportunity area 370 may have a large number of corresponding remedial content elements 386 such that all or substantially all of a predetermined number of remedial content elements to be included in the set of personalized interface elements may be selected from the first set of remedial content elements. In order to avoid over representing the highest ranked opportunity area 370 in the set of personalized interface elements (and therefore under-representing other opportunity areas), a number M of remedial content elements 386 selected from a set associated with any one of the opportunity areas 370 may be limited to a predetermined maximum to prevent a limited number of opportunity areas 370 from providing all or substantially all of the personalized interface elements. In some embodiments, the predetermined maximum number of corresponding remedial content elements 386 may be proportionate to a likelihood of a opportunity area 370 (e.g., a corresponding knowledge sub-domain) being included in a corresponding evaluation. Including a predetermined minimum and/or maximum threshold of remedial content elements 386 for a predetermined number of opportunity areas 370 may ensure an appropriate weighted distribution of the remedial content elements 386 in a personalized interface content plan.

For example, in some embodiments, each potential opportunity area 370 is associated with one or more topics and/or sub-domains within the knowledge domain. Similarly, each of the assessment interface elements 356 and/or the selectable sub-elements 358 may also be associated with a topic and/or sub-domain. Applicable opportunity areas 370 may be determined by matching an associated topic and/or sub-domain associated with an opportunity area to a topic and/or sub-domain associated with one or more of the selected selectable sub-elements 358. In some embodiments, matching between the topics and/or sub-domains does not need to be exact. For example, matching may include similarly related topics and/or sub-domains that have been predefined and/or pre-associated to provide accurate and relevant opportunity areas 370. In some embodiments, the one or more features of each of the selected ones of the assessment interface elements 356 are used to obtain a plurality of content, for example, by applying a vector pointer database retrieval process 500. The plurality of content elements may include, but is not limited to, passive content (e.g., a plurality of questions, a plurality of videos, a plurality of books, a plurality of flashcards, and a plurality of explanations), interactive content (e.g., simulations, interactive case studies, etc.), hybrid content, etc. User preferences may be provided by a user prior to, concurrently, and/or after selecting one or more of the selectable content elements 386 for one or more assessment interface elements 356.

Once the interface generation engine 352 obtains the opportunity areas 370, the plurality of content elements, and the user preferences, it may generate one or more personalized interface elements. For example, according to some embodiments, the plurality of features include one or more categories, a set of related content categories, a duration of time, one or more sets of instructions, and/or a set of one or more remedial content elements. In some embodiments, the second interface 380 is generated by the interface generation engine 352 as a table, wherein each of the columns of the table contains one or more personalized interface elements. In some examples, the second interface 380 comprises multiple tables to distinguish between different sessions (e.g. days) of a personalized content plan.

The remedial content elements 386 may include, but are not limited to, passive content (e.g., videos, books, textual content elements), interactive content (e.g., simulations, interactive case studies, etc.), hybrid content, etc. In some embodiments, a tag and/or other identifier may be associated with the entirety of a video, a book, and/or a textual element and/or may be associated with only a relevant portion of a content element. For example, a desired content element may correspond only to a smaller subsection of a long video, book, textual element, etc. In some embodiments, efficient retrieval of only a relevant portion of a desired content element may be obtained. For example, a textual representation such as a transcription of a video, the text of a book, etc., is obtained, sectioned into predetermined portions, and stored in the database 14. Content elements representative of portions of a larger content element may be retrieved by utilizing tags and/or comparisons of the semantic text as discussed above. In some embodiments, semantic comparisons may be provided by using language models embeddings filtered on the semantics of the text, such as, for example, one or more open source language models (e.g., one or more of a Bidirectional Encoder Representations from Transformers (BERT) model, a generative pre-trained transformer (GPT) model, a Word2Vec model, a Global Vectors for Word Representation (GloVe) model), a closed-source model, etc. One or more of the selected language models may be fine-tuned to better align with one or more specific semantics of analyzes text. One or more language models may be selected based on suitable factors, such as performance targets, available computational resources, nature of content elements, etc.

With reference again to FIGS. 3 & 4, at step 312, a personalized interface content plan 374 is generated. The personalized interface content plan 374 includes a data structure including one or more data elements representative of and/or identifying the set of N highest ranked opportunity areas 370 and/or sets of remedial content elements 386 associated with the set of N highest ranked opportunity areas 370. The personalized interface content plan 374 may include one or more user preferences 366, such as, for example, periods of interaction with an interface, such as a number of days a week a user is available to interact with a knowledge-based interface, a preferred time duration per session, a preferred time duration per date, day, week, month year, etc. of a user's availability, the types of material a user prefers, etc. The personalized interface content plan 374 may be stored in a database, such as database 14, and/or may be provided directly to one or more additional engines, modules, etc., such as an interface generation engine 352.

Figure 8:
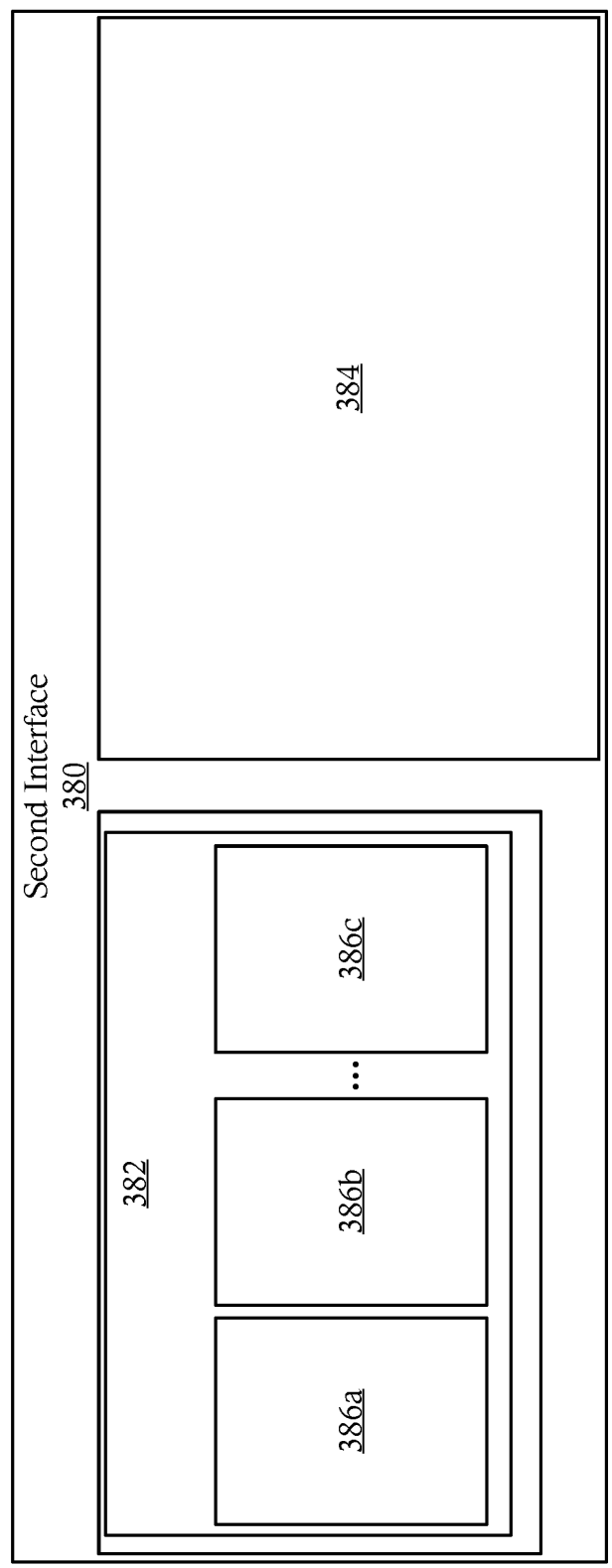
FIG. 8 illustrates a second interface including one or more one or more remedial content elements, in accordance with some embodiments.

At step 314, a second interface 380 is generated based, at least in part, on the personalized interface content plan 374. The second interface 380 may be generated by one or more devices, systems, engines, modules, etc., such as the interface generation engine 352. FIG. 8 illustrates a second interface 380 including one or more one or more remedial content elements 386, in accordance with some embodiments. The second interface 380 may include a remedial content area 382 configured to include, display, and/or otherwise incorporate personalized remedial content elements 386. The second interface 380 may include personalized remedial content elements 386. The personalized remedial content elements 386 include one or more remedial content elements 386 associated with one or more opportunity areas 370 included in a personalized interface content plan 374. For example, in various embodiments, a set of M remedial content elements 386 are selected for inclusion in a personalized interface content plan 374 and a set of X remedial content elements 386 included in the personalized interface content plan 374 are displayed as personalized remedial content elements 386. The set of personalized remedial content elements 386 may be selected based on a ranking of opportunity areas 370 and/or associated remedial content elements 386, user preferences 366, and/or any other suitable criteria.

In some embodiments, the second interface 380 includes and/or is defined as a table interface with one or more of the columns of the table including one or more personalized content elements 386a-386c (collectively "personalized content elements 386"). The second interface 380 may include multiple tables to distinguish between different sessions (e.g. days) of a personalized interface content plan. The personalized content elements 386 may be displayed in subsequent rows of a corresponding column as text, user interactive text, hyperlinks, buttons, etc.

In some embodiments, the second interface 380 may be configured to be display for a predetermined duration of time. One or more user preferences 366 may indicate a total amount of time a user may dedicate to interactions with an interface (e.g., study time) until a predetermined data and/or for a given time period (e.g. a specific date, day, week, month, or year). User preferences 366 may also define incremental quantities for a given time period. A duration of interface interaction time may be determined and utilized to select one or more interface elements, such as one or more personalized remedial content elements 386, to adhere to the predetermined duration of time. For example, according to some embodiments, interface elements displayed on the second interface 380 may be altered to provide a set of the most relevant personalized remedial content elements 386. As another example, a predetermined maximum number of personalized remedial content elements 386 and/or a predetermined minimum number of opportunity areas 370 to be included in the second interface 380 may be altered. The selection of interface elements based on time preferences may be based on estimated predictions of an amount of time the user takes to review certain personalized remedial content elements 386. The estimated time may be a one or more of a predicted time to answer newly presented assessment interface elements, a time of a video, a predicted time to read textual content, a predicted time to complete independent study, a predicted time to review previously presented interface elements, etc.

In some embodiments, the second interface 380 includes a supplemental content area 384 configured to display and/or include supplemental content. For example, the supplemental content area 384 may include one or more sets of instructions indicating how to interact with the personalized remedial content elements 386. As another example, the supplemental content area 384 may be configured to display supplemental content related to a selected one of the personalized remedial content elements 386. The corresponding supplemental content may include, but is not limited to, previously presented assessment interface elements 356, explanations for previously presented assessment interface elements 356, explanations for expected and/or unexpected selectable sub-elements 358, new assessment interface elements, text-based material, audiovisual material, etc. Textual content may include, but is not limited to, semantic text, user interactive text, hyperlinks, etc.

In some embodiments, the disclosed systems and methods may be iteratively adjusted and/or refined based on feedback data, for example, by adjusting one or more applied model. Feedback data may include, but is not limited to, interaction data, human expert input, automated outputs, etc. In some embodiments, the disclosed systems and methods may include definition, application, and refinement of one or more rules and/or iterative feedback mechanisms, such as a reinforcement learning mechanism. Although specific embodiments are disclosed herein, it will be appreciated that any suitable feedback mechanisms and/or iterative refinement processes may be applied.

Although the methods described above are with reference to the illustrated flowcharts, it will be appreciated that many other ways of performing the acts associated with the methods may be used. For example, the order of some operations may be changed, and some of the operations described may be optional.

In addition, the methods and system described herein may be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods may be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits.

Although the subject matter has been described in terms of exemplary embodiments, it is not limited thereto. Rather, the appended claims should be construed broadly, to include other variants and embodiments, which may be made by those skilled in the art.

What is claimed is:

1. A system, comprising:
a non-transitory memory;
a processor communicatively coupled to the non-transitory memory, wherein the processor is configured to read a set of instructions to:
generate a first interface including one or more sets of interface elements, wherein the first interface allows selection of one interface element in each of the one or more sets of interface elements;
obtain, via user selection, a selected interface element for each of the one or more sets of interface elements, wherein each of the selected interface elements is associated with one or more factors including a tag and a semantic text;
apply, as inputs, the one or more factors for each of the selected interface elements for a trained vector model comprising a neural network to,
determine one or more opportunity areas based on the selected interface element for each of the one or more sets of interface elements; and/or
identify a personalized interface content plan that includes a plurality of content, wherein
the trained vector model is trained to generate vectors from the provided inputs and compare the generated vectors to known vectors stored in a database to generate outputs; and
generate a second interface comprised of one or more study features based on the one or more opportunity areas and/or the plurality of content.

2. The system of claim 1, wherein the processor is configured to generate the one or more study features by:
generating a relevance determination for each of the one or more opportunity areas;
ranking the relevance determination for each of the one or more opportunity areas; and
generating the one or more study features, wherein the one or more study features displays the plurality of content corresponding to the relevance determination ranking of the one or more opportunity areas.

3. The system of claim 2, wherein the plurality of content includes one or more of the group consisting of: a plurality of questions, a plurality of videos, a plurality of books, a plurality of flashcards, and a plurality of explanations.

4. The system of claim 3, wherein the processor is configured to generate the plurality of content based on vector-pointer database retrieval.

5. The system of claim 4, wherein the vector-pointer database retrieval comprises comparing a tag and a plurality of content using language model embeddings filtered on taxonomy.

6. The system of claim 5, wherein vector-pointer database retrieval comprises:
obtaining a transcription of a plurality of videos and a plurality of books;
sectioning the transcription of the plurality videos and the pluralities of books by a determined portion and obtaining the transcription of each section; and
retrieving the plurality of content by comparing the semantic text of the selected one interface element and the semantic text of the transcription of a plurality of content using language model embeddings filtered on the semantics of the text.

7. The system of claim 6, wherein the second interface comprised of the one or more study features comprises one or more categories associated with each of the one or more sets of interface elements, a set of related content categories of the one or more categories, a duration of time to study for a time period, one or more sets of instructions, and/or a set of one or more remedial content elements.

8. A computer-implemented method, comprising:
generating a first interface including one or more sets of interface elements, wherein the first interface allows selection of one interface element in each of the one or more sets of interface elements;
obtaining, via user selection, a selected interface element for each of the one or more sets of interface elements, wherein each of the selected interface elements is associated with one or more factors including a tag and a semantic text;
applying as inputs, the one or more factors for each of the selected interface elements for a trained vector model comprising a neural network to,
determining one or more opportunity areas based on the selected interface element for each of the one or more sets of interface elements; and/or
identifying a personalized interface content plan that includes a plurality of content, wherein
the trained vector model is trained to generate vectors from the provided inputs and compare the generated vectors to known vectors stored in a database to generate outputs; and
generating a second interface comprised of one or more study features based on the one or more opportunity areas and/or the plurality of content.

9. The computer implemented method of claim 8, wherein generating a plurality of features based on the one or more opportunity areas, the plurality of content, and the set of user preferences includes:
generating a relevance determination for each of the one or more opportunity areas;
ranking the relevance determination for each of the one or more opportunity areas; and
generating one or more study features wherein the one or more study features displays the plurality of content corresponding to the relevance determination ranking of the one or more opportunity areas.

10. The computer implemented method of claim 9, wherein the plurality of content includes one or more of the group consisting of: a plurality of questions, a plurality of videos, a plurality of books, a plurality of flashcards, and a plurality of explanations.

11. The computer implemented method of claim 10, comprising generating the plurality of content based on vector-pointer database retrieval.

12. The computer implemented method of claim 11, wherein the vector-pointer database retrieval comprises comparing a tag and a plurality of content using language model embeddings filtered on taxonomy.

13. The computer implemented method of claim 12, wherein vector-pointer database retrieval comprises:
obtaining a transcription of a plurality of videos and a plurality of books;
sectioning the transcription of the plurality videos and the pluralities of books by a determined portion and obtaining the transcription of each section; and
retrieving the plurality of content by comparing the semantic text of the selected one interface element and the semantic text of the transcription of a plurality of content using language model embeddings filtered on the semantics of the text.

14. The computer implemented method of claim 13, wherein the second interface comprised of the one or more study features comprises one or more categories associated with each of the one or more sets of interface elements, a set of related content categories of the one or more categories, a duration of time to study for a time period, one or more sets of instructions, and/or a set of one or more remedial content elements.

15. A non-transitory computer readable medium having instructions stored thereon, wherein the instructions, when executed by at least one processor, cause at least one device to perform operations comprising:
generating a first interface including one or more sets of interface elements, wherein the first interface allows selection of one interface element in each of the one or more sets of interface elements;
obtaining, via user selection, a selected interface element for each of the one or more sets of interface elements, wherein each of the selected interface elements is associated with one or more factors including a tag and a semantic text;
applying as inputs, the one or more factors for each of the selected interface elements for a trained vector model comprising a neural network to,
determining one or more opportunity areas based on the selected interface element for each of the one or more sets of interface elements; and/or
identifying a personalized interface content plan that includes a plurality of content, wherein
the trained vector model is trained to generate vectors from the provided inputs and compare the generated vectors to known vectors stored in a database to generate outputs; and
generating a second interface comprised of one or more study features based on the one or more opportunity areas and/or the plurality of content.

16. The non-transitory computer readable medium of claim 15, wherein the instructions, when executed by at least one processor, cause at least one device to generate the one or more study features by:
generating a relevance determination for each of the one or more opportunity areas;
ranking the relevance determination for each of the one or more opportunity areas; and
generating one or more study features wherein the one or more study features displays the plurality of content corresponding to the relevance determination ranking of the one or more opportunity areas.

17. The non-transitory computer readable medium of claim 16, wherein the processor is configured to read a set of instructions to generate the plurality of content based on vector-pointer database retrieval.

18. The non-transitory computer readable medium of claim 17, wherein the vector-pointer database retrieval comprises comparing a tag and a plurality of content using language models embeddings filtered on taxonomy.

19. The non-transitory computer readable medium of claim 18, wherein vector-pointer database retrieval comprises:
obtaining a transcription of a plurality of videos and a plurality of books;
sectioning the transcription of the plurality videos and the pluralities of books by a determined portion and obtaining the transcription of each section; and
retrieving the plurality of content by comparing the semantic text of the selected one interface element and the semantic text of the transcription of a plurality of content using language models embeddings filtered on the semantics of the text.

20. The non-transitory computer readable medium of claim 19, the second interface comprised of the one or more study features comprises one or more categories associated with each of the one or more sets of interface elements, a set of related content categories of the one or more categories, a duration of time to study for a time period, one or more sets of instructions, and/or a set of one or more remedial content elements.

* * * * *